J. G. McCARREN.
POT FOR USE IN ANNEALING AND CARBONIZING METALS.
APPLICATION FILED FEB. 8, 1917.
1,232,346.
Patented July 3, 1917.
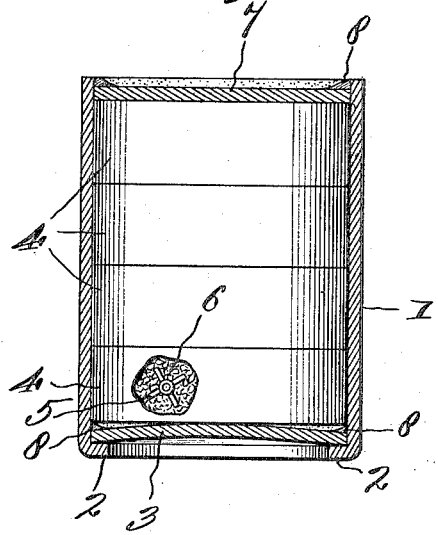
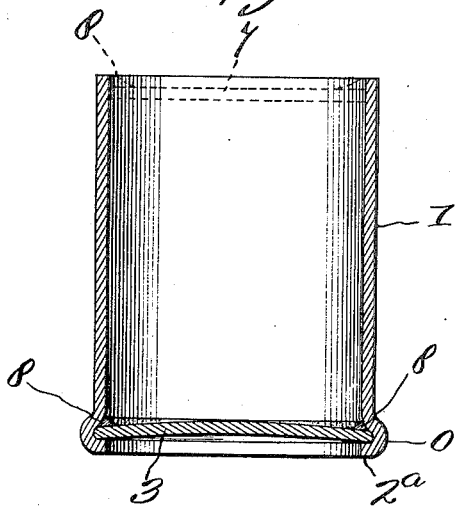
Witness
Edwin J Beller.
Inventor
Joseph G. McCarren,
by Wilkinson, Giusta & MacKay,
Attorneys.

UNITED STATES PATENT OFFICE.

JOSEPH G. McCARREN, OF ROCKFORD, ILLINOIS.

POT FOR USE IN ANNEALING AND CARBONIZING METALS.

1,232,346.    Specification of Letters Patent.    Patented July 3, 1917.

Application filed February 8, 1917. Serial No. 147,452.

*To all whom it may concern:*

Be it known that I, JOSEPH G. MCCARREN, a citizen of the United States, residing at Rockford, in the county of Winnebago and State of Illinois, have invented certain new and useful Improvements in Pots for Use in Annealing and Carbonizing Metals; and I do hereby declare the following to be a full, clear, and exact descripton of the invention, such as will enable others skilled in the art to which it appertains to make and use the same.

My invention relates to improvements in apparatus for use in annealing and carbonizing metals, and it consists in providing a suitable annealing or carbonizing pot which is not apt to get out of order, and which may be cheaply and simply manufactured.

The present practice is ordinarily to have these pots made with bottoms welded in, and when subjected to the intense heat incident to use, the edges of the weld burn out.

According to my invention I provide a loose bottom piece preferably arched in shape, which is mounted on an annular shelf or flange and is luted with clay or other suitable material. The top fits in loose and is also luted.

My invention will be more fully understood after reference to the accompanying drawings, in which—

Figure 1 shows a central vertical section through the improved pot with the ordinary carbonizing trays mounted therein, parts being broken away; and Fig. 2 is a similar view of a modification, but shows the pot empty.

Referring first to Fig. 1, 1 represents a cylindrical shell of refractory metal, which is flanged inward as at 2, and is provided with a loose bottom 3, preferably arched as shown. This pot may be used without the trays 4; but where small articles are to be carbonized, or annealed, it is preferable to have the trays.

5 represents one of the articles being treated and 6 represents the powdered charcoal in which the articles being carbonized are inclosed.

After the trays are put in, the top 7 is put in place, and the luting 8, of clay or other suitable material, is placed around the edges of the top, and similar luting 8 is also placed around the edges of the bottom before the trays are inserted.

In the form of device shown in Fig. 2, the bottom of the pot is curved outward as at 0 and is provided with an inwardly-projecting flange 2ª; the top 7 is shown in dotted lines, and the luting 8 applied as usual.

Having thus described my invention, what I claim and desire to secure by Letters Patent of the United States is:

A pot for use in annealing and carbonizing metals comprising a hollow cylindrical metal shell open at both ends and made in a single piece having one end flanged inwardly, a loose bottom in the form of a solid disk supported on said flange, and a loose top, substantially as described.

In testimony whereof, I affix my signature.

JOSEPH G. McCARREN.